US009077548B2

(12) United States Patent
Jeong

(10) Patent No.: US 9,077,548 B2
(45) Date of Patent: Jul. 7, 2015

(54) METHOD AND APPARATUS FOR PROVIDING DIFFERENTIAL LOCATION-BASED SERVICE USING ACCESS POINT

(75) Inventor: Seung-Hyuk Jeong, Seoul (KR)

(73) Assignee: KT Corporation, Seongnam (KR)

( * ) Notice: Subject to any disclaimer, the term of this patent is extended or adjusted under 35 U.S.C. 154(b) by 375 days.

(21) Appl. No.: 13/441,665

(22) Filed: Apr. 6, 2012

(65) Prior Publication Data
US 2012/0258732 A1 Oct. 11, 2012

(30) Foreign Application Priority Data
Apr. 8, 2011 (KR) ........................ 10-2011-0032702

(51) Int. Cl.
| H04W 24/00 | (2009.01) |
| H04W 19/00 | (2010.01) |
| G01S 19/00 | (2010.01) |
| G01S 19/06 | (2010.01) |
| H04L 12/14 | (2006.01) |
| H04W 64/00 | (2009.01) |
| H04W 4/24 | (2009.01) |

(52) U.S. Cl.
CPC ........ H04L 12/1432 (2013.01); H04L 12/1485 (2013.01); H04W 4/24 (2013.01); H04W 64/00 (2013.01)

(58) Field of Classification Search
CPC . H04L 12/1432; H04L 12/1485; H04W 4/24; H04W 64/00
USPC ............... 455/456.1, 456.2, 456.3; 370/338; 342/357.2, 375.43
See application file for complete search history.

(56) References Cited

U.S. PATENT DOCUMENTS

| 2005/0148340 | A1* | 7/2005 | Guyot .................... 455/456.2 |
| 2010/0020776 | A1* | 1/2010 | Youssef et al. ............. 370/338 |
| 2010/0265092 | A1* | 10/2010 | Kim et al. ............... 340/825.49 |
| 2013/0196686 | A1* | 8/2013 | Huang et al. ............ 455/456.1 |
| 2014/0004882 | A1* | 1/2014 | Johnson et al. .......... 455/456.2 |
| 2014/0049424 | A1* | 2/2014 | Alizadeh-Shabdiz ..... 342/357.2 |

FOREIGN PATENT DOCUMENTS

| KR | 10-2006-0095052 B1 | 9/2006 |
| KR | 10-2008-0108689 A | 12/2008 |
| KR | 10-2009-0055104 A | 6/2009 |
| KR | 10-2010-0034329 A | 4/2010 |
| KR | 10-2011-0032304 A | 3/2011 |

OTHER PUBLICATIONS

International Search Report dated Oct. 24, 2012 issued in Korean Patent Application No. PCT/KR2012/002640.

* cited by examiner

*Primary Examiner* — Opiribo Georgewill
(74) *Attorney, Agent, or Firm* — Sughrue Mion, PLLC

(57) ABSTRACT

A location detecting method and an apparatus for providing a differential location-based service to detect a location of a communication terminal using an access point for a wireless local area network service is provided. The method includes storing location coordinates of access points, receiving service grade information and information related to nearby access points from the communication terminal, selecting a predetermined number of nearby access points based on the received service grade information and information of nearby access points, obtaining a location coordinate of each of the selected nearby access points, and calculating a centric coordinate using the obtained location coordinates of at least two of the selected access points, and determining the calculated centric coordinate as the detected location of the communication terminal.

29 Claims, 11 Drawing Sheets

Fig. 4

| GROUP (400) | TIME (410) | LOCATION(LATITUDE/LONGITUDE) (430) | MAC ADDRESS (450) | RSSI (470) | cell ID (490) |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.112 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

Fig. 10
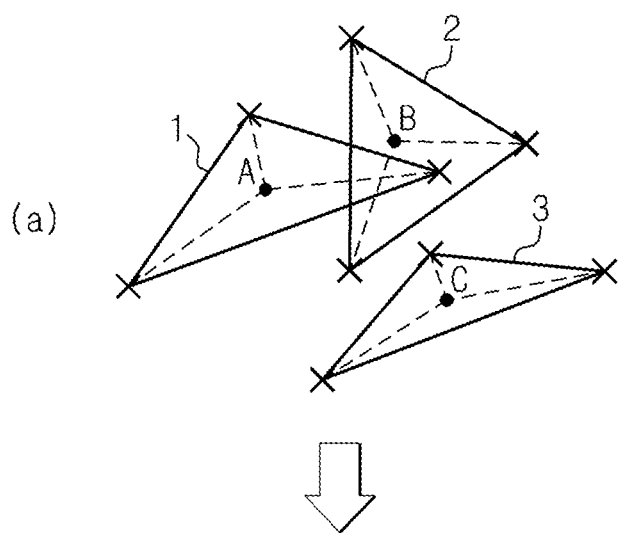
(a)
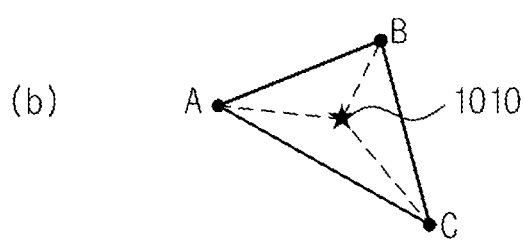
(b)

METHOD AND APPARATUS FOR PROVIDING DIFFERENTIAL LOCATION-BASED SERVICE USING ACCESS POINT

CROSS-REFERENCE TO RELATED APPLICATION(S)

This application claims the benefit of priority from Korean Patent Application No. 10-2011-0032702, filed on Apr. 8, 2011 in the Korean Intellectual Property Office, the disclosure of which is incorporated herein by reference in its entirety.

BACKGROUND

1. Field

Exemplary embodiments broadly relate to a location detecting service technique of a communication terminal, and more particularly, to a method and an apparatus for providing a differential location-based service using an access point for a wireless local area network (WLAN) service.

2. Description of the Related Art

With the development of mobile communication techniques, studies have been actively conducted on location detecting techniques that detect a location of a communication terminal in a communication network. For example, a global positioning system (GPS)-based location detecting technique using satellites, a location detecting technique using base stations, and the like, have been developed.

The GPS-based location detecting technique has a disadvantage of requiring that a GPS receiver be mounted on a communication terminal. Also, because the GPS-based location detecting technique was developed by the U.S. Department of Defense for a military use, a high-precision GPS-based location detecting technique is not publicly known or available.

The base station-based location detecting technique has an advantage of not having to mount a GPS receiver on a communication terminal, but has a drawback of a low accuracy in the location detection by having a larger offset by tens to hundreds meters more than the GPS-based location detecting technique.

Recently, a wireless local area communication service using a wireless local area network (WLAN) is receiving attention. The WLAN-based service enables communication terminal users to wirelessly connect their communication terminals within a predetermined area from a WLAN access point to the Internet. The communication terminals, such as, for example, laptop computers, personal digital assistants (PDAs), smart phones, and the like, have a WLAN card mounted therein. To meet the increasing demand for the WLAN service, installations of access points indoors/outdoors have increased.

Because many access points have now been installed indoors/outdoors, a location of a communication terminal can be determined or obtained by using the access points in buildings where a GPS-based location detecting technique could not otherwise be applied. Also, as the number of access points increases, a location of a communication terminal can be determined with a higher accuracy than that of a base station-based location detecting technique.

Accordingly, research and development on a location detecting technique using an access point of a WLAN service has recently been rapidly increasing.

SUMMARY

Exemplary embodiments provide a location detection method and apparatus for providing a differential location-based service to detect a location of a communication terminal using an access point for a wireless local area network (WLAN) service.

One or more exemplary embodiments may overcome the above disadvantages and other disadvantages not described above. However, it is understood that one or more exemplary embodiment are not required to overcome the disadvantages described above, and may not overcome any of the problems described above.

Additional features of exemplary embodiments will be set forth in the following detailed description, and in part will be even more apparent from the examples set forth, or may be learned by practice.

one exemplary aspect, a method of detecting a location of a communication terminal in a communication system may include selecting a predetermined number of access points among a plurality of access points based on at least one of user input and attributes of the plurality of access points, obtaining a location coordinate of each of the selected access point, and calculating a centric coordinate using the obtained location coordinates of at least two of the selected access points, and determining the calculated centric coordinate as the detected location of the communication terminal.

The method may further include storing the location coordinates of at least two of the plurality of access points and receiving a service grade information as the user input. The calculating may include grouping the obtained location coordinates and calculating a centric coordinate in each group, and grouping the calculated centric coordinates and calculating a centric coordinate of each calculated centric group in a repetitive manner to obtain the detected location.

The method may further include billing the communication terminal for a location detecting service based on the received service grade information.

In another exemplary aspect, an apparatus for detecting a location of a communication terminal may include a selecting unit which selects a predetermined number of access points among a plurality of access points based on at least one of user input and attributes of the plurality of access points, and a calculating unit which obtains a location coordinate of each of the selected access points, to calculate a centric coordinate using the obtained location coordinates of at least two of the selected access points, and to determine the calculated centric coordinate as the detected location of the communication terminal.

The calculating unit may group the obtained location coordinates and calculate a centric coordinate in each group, and group the calculated centric coordinates and calculate a centric coordinate of each calculated centric group in a repetitive manner to obtain the detected location of the communication terminal.

In yet another exemplary aspect, an apparatus for detecting a location of a communication terminal may include a receiving unit which receives service grade information and information about access points among the plurality of access points, where the access points are selected based on the received service grade information, and a calculating unit which obtains a location coordinate of each of the selected access points, to calculate a centric coordinate using the obtained location coordinates of at least two of the selected access points, and to determine the calculated centric coordinate as the detected location of the communication terminal.

BRIEF DESCRIPTION OF THE DRAWINGS

The above and/or other aspects will be more apparent by describing in detail exemplary embodiments, with reference to the accompanying drawings, in which:

FIG. 4 is a table illustrating access point information for a location according to an exemplary embodiment.

FIG. 10 is a conceptual diagram illustrating calculating of a location coordinates of a communication terminal according to an exemplary embodiment.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be apparent to those of ordinary skill in the art. Also, descriptions of well-known functions and constructions may be omitted for increased clarity and conciseness.

Throughout the drawings and the detailed descriptions, unless otherwise described, the analogous alphanumeric references will be understood to refer to analogous elements, features, and structures. The relative size and depiction of these elements may be exaggerated for clarity, illustration, and convenience.

Figure 1:
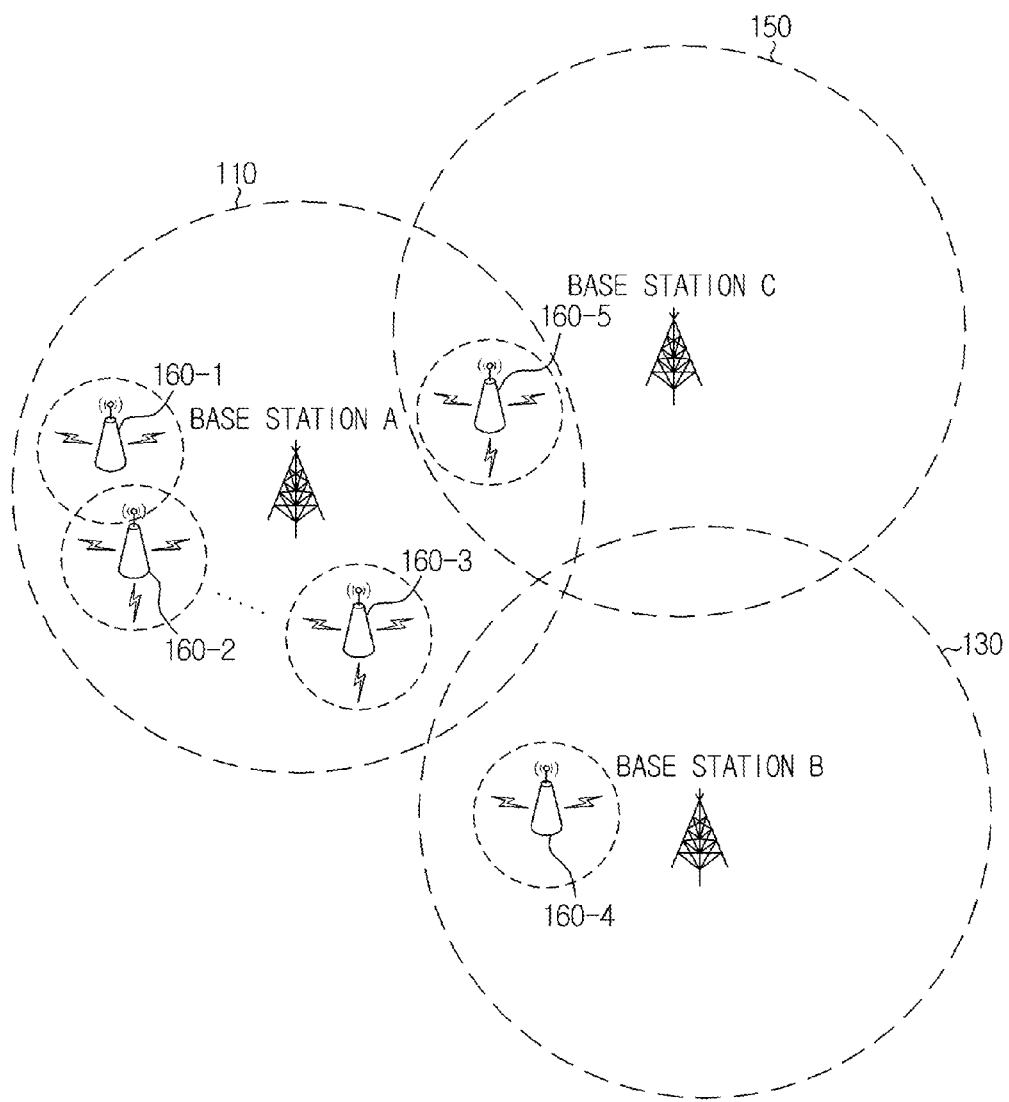
FIG. 1 is a diagram illustrating a communication environment according to an exemplary embodiment.

FIG. 1 is a diagram illustrating a communication environment according to an exemplary embodiment.

Referring to FIG. 1, the communication environment includes base stations A, B, and C (or NodeBs) that provide a mobile communication service, and access points 160-1, 160-2, 160-3, 160-4, and 160-5 (APs) that provide an Internet service using a WLAN system, for example, Wireless Fidelity (WiFi), in an overlapping arrangement. It is noted that a number of base stations, access points, communication areas, and so on is provided by way of an example only and there may be more or less access points, base stations, communication areas in an exemplary embodiment. A communication terminal may use various services including voice communication and wireless Internet services. When the communication terminal is a mobile communication terminal, these servers may be provided via the base station A, B, or C. Also, the communication terminal may use an Internet service by connecting to a wired Internet network via one of the access points 160.

Generally, the base station has a roughly circular coverage area corresponding to a radius of several kilometers to tens of kilometers, while the access point providing a wireless local area network (WLAN) service has a roughly circular coverage area corresponding to a radius of only several meters. This is provided by way of an example and not by way of a limitation. Base stations and access points with other coverages as is currently known or later developed are within the scope of an exemplary embodiment. Due to the low cost for purchasing and installing the access points, they are often installed in large numbers at various places and in many types of buildings, such as, for example, houses, offices, shopping malls, and the like.

As shown in FIG. 1, a plurality of access points 160-1, ..., 160-5 are positioned within the coverage areas 110, 130, and 150 of their respective base stations A, B, and C. Communication terminal users may use an Internet service via at least one of the access points 160-1, ..., 160-5 at locations where a signal of the respective at least one access point 160-1, ..., 160-5 is detected. Also, where a signal of the access point 160-1, ..., 160-5 is not detected, the communication terminal users may obtain an Internet service using the base station.

Recently, with the enhanced functionality of the smart phones, the number of smart phone users is increasing. Many smart phone applications require location information from a smart phone to provide its respective service such as closest restaurants, shops, or even to indicate your status on a social network. To provide the smart phone with a high-speed Internet service or an ability to execute an application that requires internet service, the number of access points being installed is also increasing. As many access points are particularly installed in places with a large floating population, the use of the access points for a purpose of detecting a location of a device is increasing. The accuracy of a location detection using an access point which has a narrow coverage area is generally higher than that of a base station which has a wide coverage area.

Figure 2:
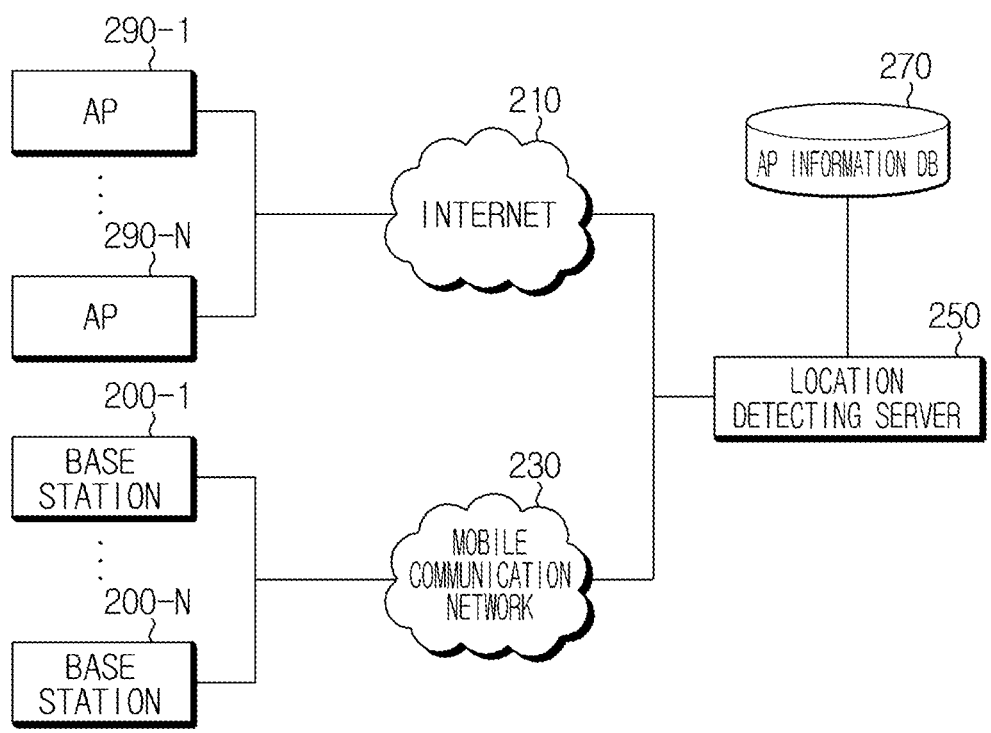
FIG. 2 is a block diagram illustrating a structure of a location detecting system according to an exemplary embodiment.

FIG. 2 is a block diagram illustrating a network structure of a location detecting system according to an exemplary embodiment.

Referring to FIG. 2, access points 290-1, ..., 290-N for providing access to a WLAN service and base stations 200-1, ..., 200-N for providing access to a mobile communication service are installed all around an area. As shown by way of an example in FIG. 1, the respective coverage areas of the access points 290-1, ..., 290-N and the respective coverage areas of the base stations 200-1, ..., 200-N may overlap. A plurality of access points may be installed within the coverage area of one base station because the base station has a wider coverage area than any one of the plurality of access points.

The access points 290-1, ..., 290-N are connected to a wired Internet network 210 to provide an Internet service. The base stations 200-1, ..., 200-N are connected to a mobile communication network 230 to provide a mobile communication service. The wired Internet network 210 and the mobile communication network 230 are linked to each other. Referring to FIG. 2, the location detecting system includes a location detecting server 250 connected to the wired Internet network 210 and the mobile communication network 230, and an access point information DB 270 managed by the location detecting server 250.

The access point information DB 270 stores identity information (such as, for example, Media Access Control (MAC) address, Service Set Identifier (SSID), and the like) of access points installed indoors/outdoors and location coordinate information where the access points are actually installed. Also, the access point information DB 270 stores access point information for a location that is collected at each location by an access point information collecting terminal while the access point information collecting terminal is mobile i.e., while the terminal is moving. The access point information for a location includes a) collection location information collected by the access point information collecting terminal in accordance with a predetermined time cycle while the access point information collecting terminal is mobile i.e., moving, b) identity information, and c) a signal strength of access points detected at the collection locations, and d) identity information of base stations. Its detailed description is provided below.

When the location detecting server 250 is requested to detect a location of a specific communication terminal, the location detecting server 250 detects a location of the communication terminal using identity information of a base station 200-1, . . . , 200-N where the communication terminal is placed and identity information of an access point 290-1, . . . , 290-N to which the communication terminal can be connected. In this instance, the location detecting server 250 provides a differential location-based service of a high premium service, a premium service, and a regular service. A location detecting method of the location detecting server 250 is described in detail below.

Figure 3:
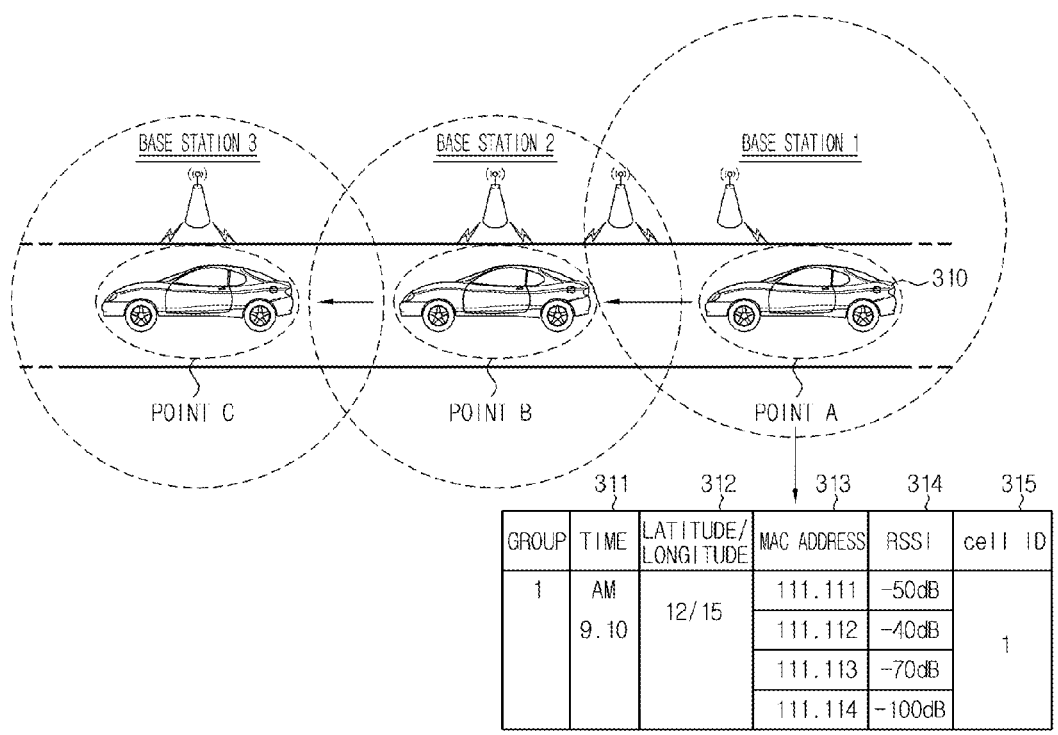
FIG. 3 is a diagram illustrating a collection of access point information for a location according to an exemplary embodiment.

FIG. 3 is a diagram illustrating the collection of access point information for a location according to an exemplary embodiment.

As shown in FIG. 3, an access point information collecting terminal is mounted in a vehicle 310 and collects information by detecting signals from nearby access points in accordance with a predetermined time cycle while the vehicle 310 is running at a low speed. The information collected by the access point information collecting terminal includes a collection time 311, a collection location information 312 (such as, for example, latitude/longitude), identity information 313 (such as, for example, MAC address) and a signal strength 314 (for example, RSSI (Received Signal Strength Indication)) of an access point which transmits a signal detected at a collection location, and identity information 315 (such as, for example, cell ID or PN (Pseudo Noise) code) of a base station which covers the corresponding collection location.

Referring to FIG. 3, using point A as an example, the access point information collecting terminal mounted in the vehicle 310 collects information of an access point which transmits a signal detected at the point A. The access point information collecting terminal collects latitude/longitude of the point A, collection time, MAC address and a signal strength (RSSI) of the access point which transmits the signal detected at the point A, and the identity information of a base station which covers the point A. As described above, the access point information collecting terminal collects information of access points detected at every point in accordance with a predetermined time cycle (such as, for example, every minute) while running at a low speed. Similar detections are performed at point B and C, the collected information is not shown in FIG. 3.

FIG. 4 is a table illustrating access point information for a location according to an exemplary embodiment. As described above with reference to FIG. 3, the access point information collecting terminal collects information of nearby access points in accordance with a predetermined time cycle while the access point information collecting terminal is moving, and an example of the collected access point information for a location is shown in FIG. 4. As shown in FIG. 4, the table has a Group field 400, a time field 410, a location field 430, a MAC address field 450, an RSSI field 470, and a cell ID field 490 and the Group field 400 is indicating each collection instance.

The time field 410 records the time when the access point information collecting terminal collects information. The location field 430 records collection location information (latitude/longitude information). The MAC address field 450 records a MAC address of an access point detected at a collection location. The RSSI field 470 records the signal strength of a signal emitted by a respective access point. That is, the RSSI field 470 detected the signal strength of the signal at the collection location. The cell ID field 490 records a cell identification (ID) of a base station covering a collection location. Although FIG. 4 shows only one cell ID for a base station being recorded, a plurality of cell IDs detected at the cell boundary may be recorded.

To detect a location of a communication terminal using an access point, the location detecting method according to the exemplary embodiment requires installation location coordinates (i.e., actual location coordinates) of access points. Generally, the access points 160 installed in many locations by communication service providers i.e., public access points, have their installation location coordinates assigned by the communication service providers. However, a personal access point, which may be installed by an individual person or persons is not related to the communication service providers. Accordingly, installation location coordinates of such a personal access point may not be known unless the installation location coordinates are identified by an installer. In this context, there may be a need to estimate installation location coordinates of an access point, for which the installation location coordinates are not identified.

Figure 5:
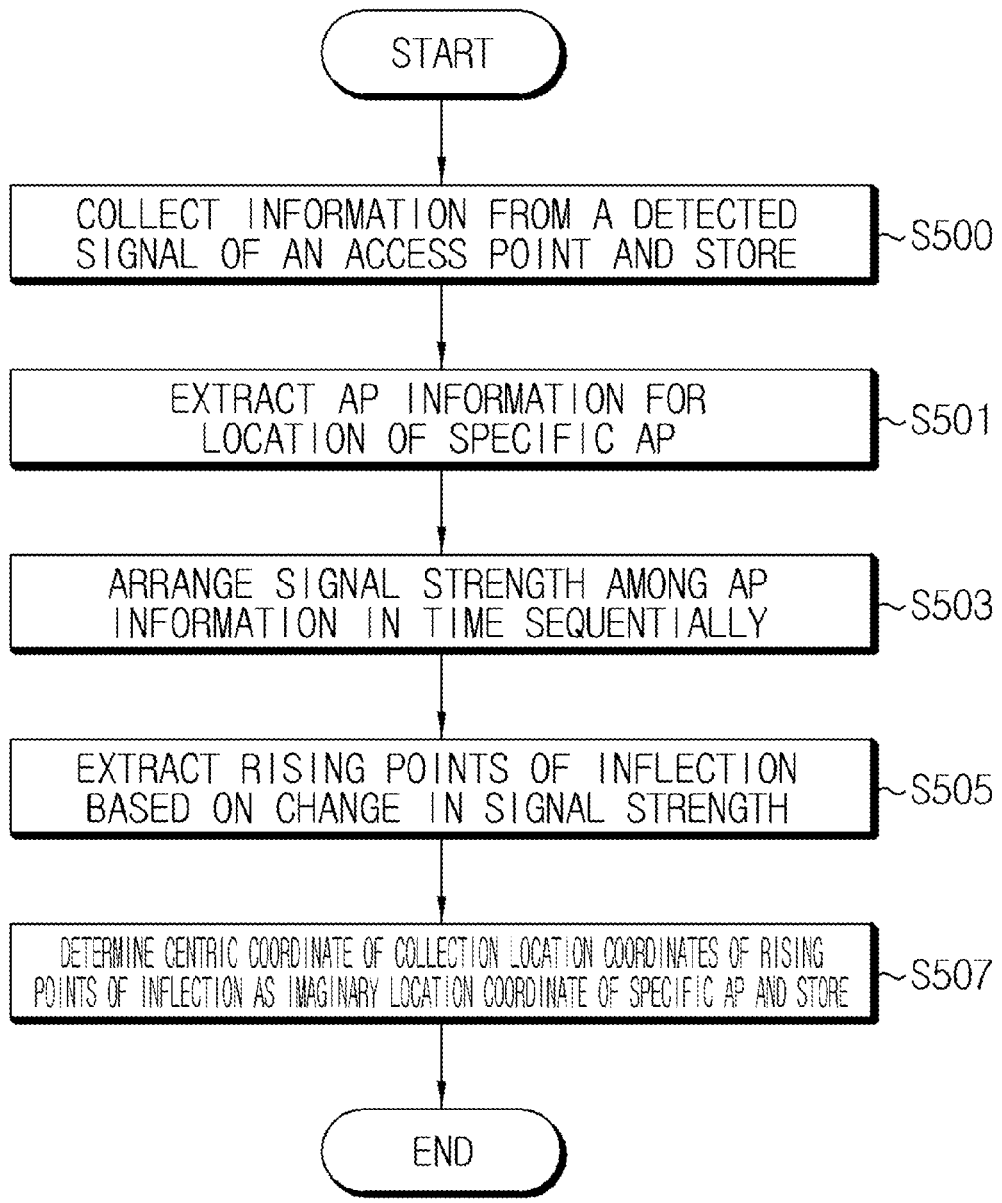
FIG. 5 is a flowchart illustrating a method of determining an imaginary location coordinates of an access point in a location detecting server according to an exemplary embodiment.

Hereinafter, described with reference to FIG. 5 is an exemplary method for estimating an installation location coordinate of an access point, of which the installation location coordinate are not identified, among the access points of which information is collected by the access point information collecting terminal while the access point information collecting terminal is mobile. That is, an estimated installation location coordinate of an access point is hereinafter defined as an imaginary location coordinate of the access point determined based on an estimated value, and not as an actual location coordinate where the access point is actually installed.

FIG. 5 is a flowchart illustrating a method of determining an imaginary location coordinates of an access point in the location detecting server according to an exemplary embodiment.

Referring to FIG. 5, the access point information collecting terminal collects information by detecting signals from nearby access points in accordance with a predetermined time cycle while running at low speed in operation S500, as for example described above with reference to FIGS. 3 and 4. The access point information for a location collected by the access point information collecting terminal may be transmitted to the location detecting server 250 via the Internet network 210 or the mobile communication network 230. The location detecting server 250 stores the received access point information for a location in the access point information DB 270 (operation S500). Alternatively, the access point information for a location collected by the access point information collecting terminal may be stored in the access point information DB 270 by an operator (operation S500).

After the access point information for a location is collected, the location detecting server 250 extracts, from the access point information DB 270, collection information (AP information) for a location of a specific access point (AP), of which an installation location coordinate is not identified, among the collected access point information for a location (S501). That is, the location detecting server 250 extracts collection information for a location including information of the specific access point. For example, when a MAC address is '111.112' as shown in FIG. 4, the location detecting server 250 extracts information of Group 1, Group 2, Group 3, Group 4, and Group N−1 including MAC address '111.112'. That is, the location detecting server 250 stores all group information stored in the access point information DB 270 and extracts all groups that include the location information for the specific access point.

After the collection information for a location of the specific access point is extracted as described above, the location detecting server 250 extracts the signal strength (for example, RSSI) among the collection information for a location and arranges the extracted signal strength in the order of time (in operation S503). For example, referring to FIG. 4, the sequential time arrangement of the signal strength of the access point having MAC address '111.112' is −40 dB, −50 dB, −80 dB, −80 dB, and −40 dB.

Figure 6:
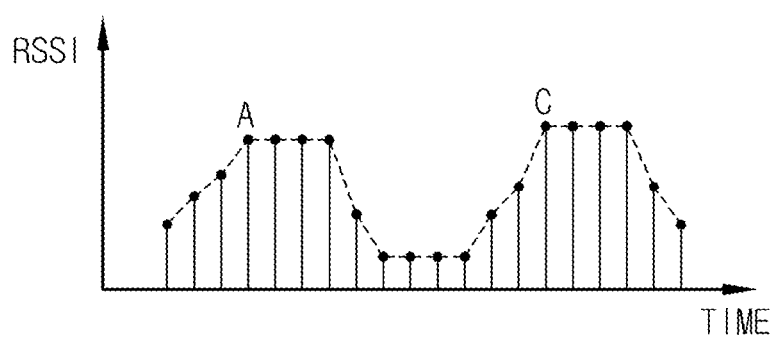
FIG. 6 is a graph diagram illustrating an example of an extraction of a rising point of inflection based on a signal strength distribution of an access point over time according to an exemplary embodiment.

After the location detecting server 250 arranges the signal strength of the specific access point in the order of time, the location detecting server 250 extracts a rising point of inflection by analyzing the changes in the signal strength over time (S505). Here, the rising point of inflection is a point where the signal strength rises and reaches the highest. Specifically, FIG. 6 shows an example of the extraction of a rising point of inflection based on a signal strength distribution of an access point over time. As shown in FIG. 6, when the signal strength of the access point is arranged in the order of time, points A and C are where the signal strength rises and reaches the highest, and thus, these points A and C are extracted as rising points of inflection.

After the rising points of inflection are extracted as described above, the location detecting server 250 calculates a centric coordinate of a polygon (or a straight line) having the apices of a collection location coordinates of the rising points of inflection where the signal strengths of the rising points of inflection are collected. The location detecting server 250 determines the calculated centric coordinate as an imaginary location coordinate of the specific access point, and stores the imaginary location coordinate in the access point information DB 270 (S507). Here, the centric coordinate may be a barycenter or any one of an incenter and a circumcenter. Alternatively, the centric coordinate may be calculated by applying a weight to the signal strength.

In an exemplary embodiment, the reason for using a rising point of inflection is because the rising point of inflection is a point where the signal strength of an access point is the highest, and thus, is the closest to a location where the access point is actually installed.

The process for determining an imaginary location coordinate of an access point as described with reference to FIG. 5 is performed on all access points, of which installation location coordinates are not identified, among the access points collected by the access point information collecting terminal while the access point information collecting terminal is mobile.

Figure 7:
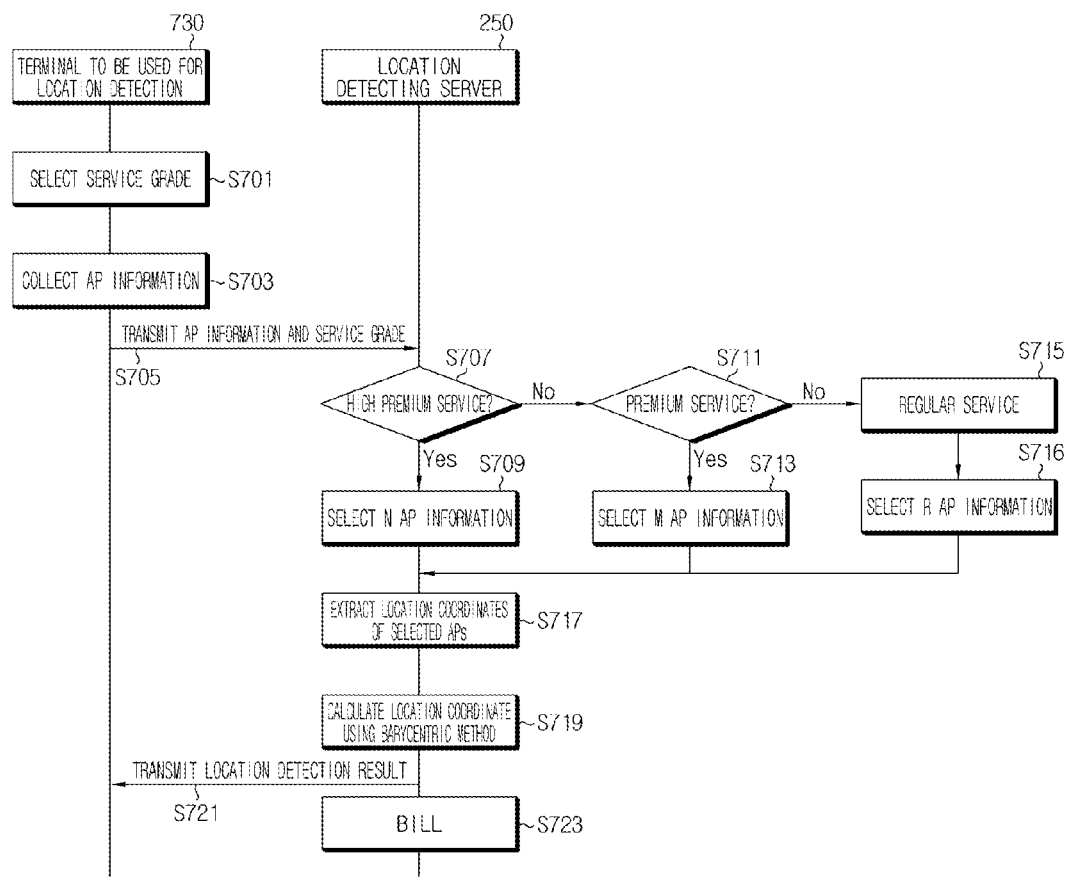
FIG. 7 is a flowchart illustrating a method of providing a location detecting service according to an exemplary embodiment.

FIG. 7 is a flowchart illustrating a method of providing a location detecting service according to an exemplary embodiment.

Referring to FIG. 7, a communication service subscriber executes an application for a location detecting service on a communication terminal 730 to request the location detecting service, and selects a desired service grade among the service grades displayed through the executed application. For example, the subscriber selects any one of a high premium service of the highest accuracy, a regular service of the lowest accuracy, and a premium service having an intermediate accuracy therebetween (in operation S701).

When the service grade is selected by the subscriber, the communication terminal 730, in particular, the application scans nearby access points to collect information (for example, MAC address and signal strength) of the nearby access points, AP information (in operation S703) and transmits the AP information of the nearby access points and the service grade selected by the subscriber to the location detecting server 250 via the communication network (in operation S705).

Although an exemplary embodiment shows a location detecting service to detect a current location of the subscriber, for example, a service for detecting a location of another subscriber may be applied. In this case, the location detecting server 250 receives a request for a service including identity information of a target communication terminal and a service grade from a specific communication terminal, and controls the target communication terminal to transmit information of nearby access points using the identity information of the target communication terminal included in the service request. Then, the target communication terminal transmits information (for example, identity information and signal strength) of nearby access points.

When the location detecting server 250 receives information of nearby access points from the communication terminal, the location detecting server 250 checks the service grade selected by the subscriber.

When a high premium service is selected as the service grade, the location detecting server 250 selects N access points among the nearby access points scanned by the communication terminal (in operations S707, S709).

When a premium service is selected as the service grade, the location detecting server 250 selects M access points among the nearby access points scanned by the communication terminal (in operations S711, S713).

When a regular service is selected as the service grade, the location detecting server 250 selects R access points among the nearby access points scanned by the communication terminal (in operations S715, S716).

Here, N>M>R, and all N, M, and R may be $L^k$ where L is a natural number of 3 or more and k is a natural number. When the location detecting server 250 selects access points, the location detecting server 250 may select top access points based on the signal strength or preferentially select access points of which actual location coordinates are stored by referring to the access point information DB 270. Further, among the access points having actual location coordinates, the location detecting server 250 may select only access points having a predetermined signal strength or more. Because an access point having low signal strength may be located at a distance from the communication terminal, an access point having low signal strength is excluded from the selection although an actual location coordinate is stored.

After the location detecting server 250 selects a predetermined number of access points based on the service grade, the location detecting server 250 extracts location coordinates of the selected access points from the access point information DB 270 (operation S717). For example, the location detecting server 250 compares the MAC address of the selected access points and the MAC addresses which are stored in the access point information DB 270, and then the location detecting server 250 extracts the location coordinate of the access point of which the MAC address exists in the access point information DB 270.

Specifically, for access points having actual location coordinates, the location detecting server 250 extracts the actual location coordinates of the corresponding access points from the access point information DB 270.

For access points having no actual location coordinates, the location detecting server 250 checks whether imaginary location coordinates of the access points are stored in the access point information DB 270, and if so, extracts imaginary location coordinates of the corresponding access points from the access point information DB 270.

For access points having no actual location coordinates and no imaginary location coordinates, the location detecting server 250 extracts collection location coordinates of the top 'i' ('i' is the number of access points) access points having high signal strength from the access point information DB 270 based on signal strength for a location of the access points detected at each collection location, as location coordinates of the corresponding access points.

For example, when there are three access points having no actual location coordinates and no imaginary location coordinates in which the signal strength for a location of the access point A is −40 dB and −50 dB, the signal strength for the location of the access point B is −50 dB, −60 dB, and −70 dB, and the signal strength for the location of the access point C is −60 dB and −100 dB, the top three signal strengths are −40 dB and −50 dB of the access point A and −50 dB of the access point B. The location detecting server 250 extracts collection location coordinates where −40 dB and −50 dB of the access point A and −50 dB of the access point B are collected, as the location coordinates of the corresponding access points.

After the location coordinates of the selected access points are extracted as described above, the location detecting server 250 calculates a final location coordinate using the extracted location coordinates by the barycentric method (in operation S719). Also, the location detecting server 250 transmits a location detection result including the final location coordinate to the communication terminal (in operation S721). The determined final location coordinate may be provided in the form of a map, or may be provided by transforming into an address corresponding to the coordinate. The form of the location information to be provided is not limited and many variations are possible. In the location detection of another communication terminal, the location detecting server 250 transmits a location detection result to a communication terminal that has requested the location detection.

After the location detecting server 250 transmits the location detection result, the location detecting server 250 bills for the service based on the service grade selected by the subscriber (in operation S723). For example, a high premium service is expensive because the accuracy in location detection is high, a regular service is free, and the location detection server 250 bills for the premium service at a lower rate than for the high premium service.

An exemplary method of calculating the location coordinates using the barycentric method is described in more detail below with reference to FIG. 9.

Figure 8:
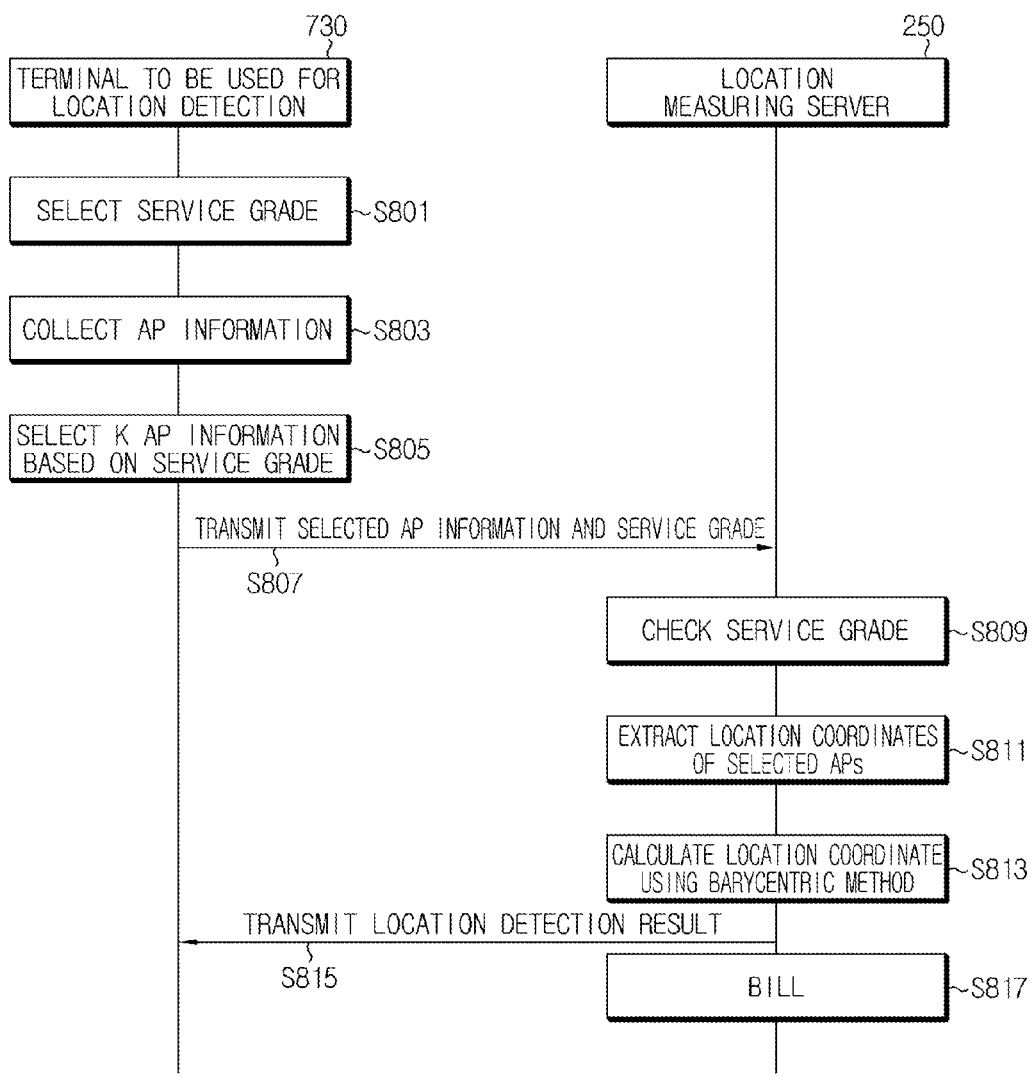
FIG. 8 is a flowchart illustrating a method of providing a location detecting service according to another exemplary embodiment.

FIG. 8 is a flowchart illustrating a method of providing a location detecting service according to another exemplary embodiment.

Referring to FIG. 8, a communication service subscriber executes an application for a location detecting service on a communication terminal to request the location detecting service, and selects a desired service grade among the service grades displayed through the executed application. For example, the subscriber selects any one of a high premium service of the highest accuracy, a regular service of the lowest accuracy, and a premium service having an intermediate accuracy therebetween (in operation S801).

When the service grade is selected by the subscriber, the communication terminal 730, in particular, the application scans nearby access points to collect information (for example, MAC address and signal strength) (AP information) of the nearby access points (in operation S803). Also, the application selects K access points among the scanned nearby access points based on the service grade selected by the subscriber (in operation S805). Here, K is Li where L is a natural number of 3 or more and 'i' is a natural number. When a higher service grade is selected, the application selects a larger number of access points. Further, when the application selects access points, the application may select top access points having high signal strength.

When the application selects access points, the application transmits the information of the selected access points and the service grade selected by the subscriber to the location detecting server 250 via the communication network (in operation S807).

After the location detecting server 250 receives information relating to the service grade, the location detecting server 250 checks the service grade selected by the subscriber (in operation S809). Also, the location detecting server 250 extracts location coordinates of the selected access points from the access point information DB 270 using the received information (MAC address and signal strength) of the access points (in operation S811).

Specifically, for access points having the actual (real) location coordinates, the location detecting server 250 extracts the actual location coordinates of the access points from the access point information DB 270.

For access points having no actual location coordinates, the location detecting server 250 checks whether imaginary location coordinates of the access points are stored in the access point information DB 270, and if so, the location detecting server extracts the imaginary location coordinates of the access points from the access point information DB 270.

For access points having no actual location coordinates and no imaginary location coordinates, the location detecting server 250 extracts collection location coordinates of the top 'i' ('i' is the number of access points) access points having a high signal strength from the access point information DB 270 based on the signal strength for the location of the access points detected at each collection location, as location coordinates of the access points.

For example, when there are three access points having no actual location coordinates and no imaginary location coordinates in which the signal strength for the location of access point A is −40 dB and −50 dB, the signal strength for the location of access point B is −50 dB, −60 dB, and −70 dB, and the signal strength for the location of access point C is −60 dB and −100 dB, the top three signal strengths are −40 dB and −50 dB of access point A and −50 dB of access point B. The location detecting server 250 extracts collection location coordinates where −40 dB and −50 dB of access point A and −50 dB of access point B are collected, as location coordinates of the access points.

After the location coordinates of the selected access points are extracted as described above, the location detecting server 250 calculates a final location coordinate using the extracted location coordinates by the barycentric method (in operation S813). Also, the location detecting server 250 transmits a location detection result including the final location coordinate to the communication terminal 730 (in operation S815). The determined final location coordinate may be provided in the form of a map, or may be provided by transforming into an address corresponding to the coordinates, or a name of a place located on these coordinates. The form of the location information to be provided is not limited.

After the location detecting server 250 transmits the location detection result, the location detecting server 250 bills for the service based on the service grade selected by the subscriber (in operation S817). For example, a high premium service is expensive because the accuracy in the location detection is high, a regular service is free, and the location detection server 250 bills for a premium service at a lower rate than a high premium service.

Figure 9:
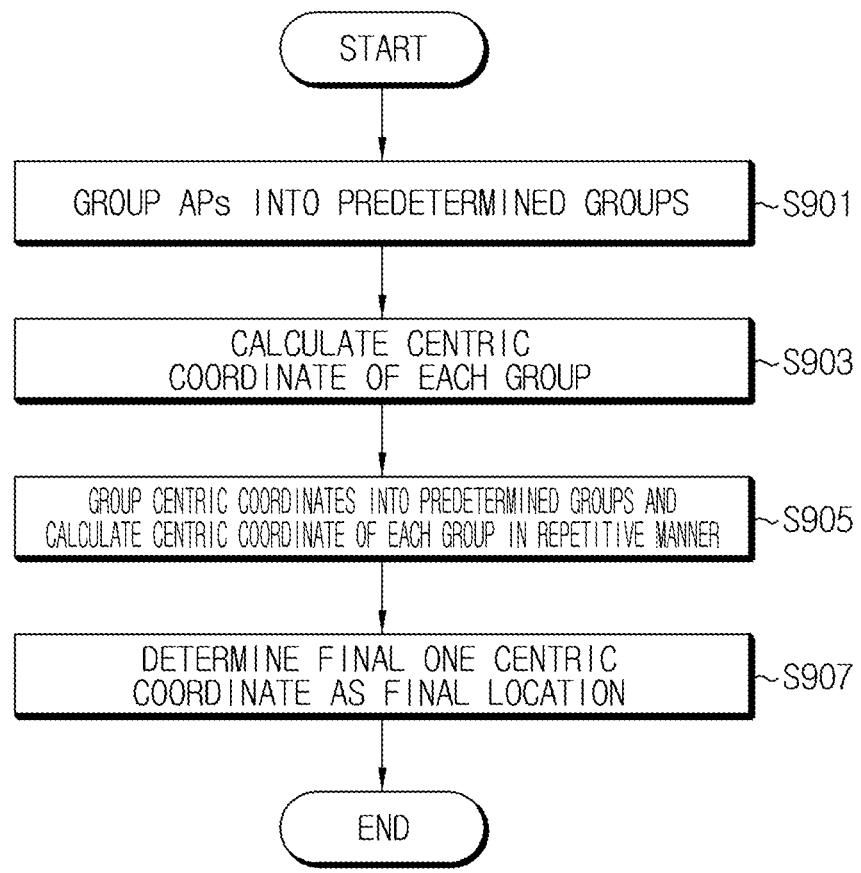
FIG. 9 is a flowchart illustrating a method of calculating a location coordinates of a communication terminal using the barycentric method according to an exemplary embodiment.

FIG. 9 is a flowchart illustrating a method of calculating a location coordinates of a communication terminal using the barycentric method according to an exemplary embodiment.

As shown in FIG. 9, the location detecting server 250 groups the access points (APs) so that A access points are included in each group where A is a natural number of 3 or more and may be equal to L as described by way of an example with reference to FIGS. 7 and 8 (in operation S901), and calculates a centric coordinate of each group using location coordinates of access points in each group (in operation S903).

An exemplary detailed description is provided below with reference to FIG. 10. FIG. 10 is a conceptual diagram illustrating the calculation of a centric coordinate according to an exemplary embodiment. In FIG. 10, nine access points are grouped into three groups (1, 2, and 3), in which three access points (A=3) are randomly selected in each group. As shown in FIG. 10(*a*), a centric coordinate of a triangle is calculated, the triangle having location coordinates (actual location coordinates or imaginary location coordinates) of three access points in each group 1, 2, or 3, as the apices. In FIG. 10(*a*), 'A', 'B', and 'C' are each a centric coordinate of a respective group 1, 2, or 3.

When the access points have actual location coordinates, the access points may be equally distributed to each group. For example, when there are three access points having actual location coordinates, one access point having an actual location coordinate is included in each group. This is to reduce an error in the location detection by including an actual location coordinate in each group because the actual location coordinate is a precise location coordinate.

Next, after the centric coordinates are calculated as described above, the location detecting server 250 groups the calculated centric coordinates, in which the centric coordinates are randomly selected in each group, and re-calculates a centric coordinate of each group. This process is repeated until one centric coordinate is obtained (in operation S905).

Specifically, in FIG. 10(*a*), the calculated centric coordinates are 'A', 'B', and 'C'. Because three centric coordinates are sufficient to form a group, further grouping is not necessary. When a centric coordinate of a triangle having the three centric coordinates as the apices is calculated, one final centric coordinate 1010 is obtained as shown in FIG. 10(*b*).

The location detecting server 250 determines one final centric coordinate 1010 obtained by the centric method as a final location of the specific communication terminal (in operation S907).

Although an exemplary embodiment shows the calculation of the centric coordinate of a triangle, this is just by way of an example and is not by way of a limitation and a polygon such as a square may be used. In this case, the same number of access points are selected as the number of the apices of a corresponding polygon and grouped, and then a centric coordinate is calculated. Also, the same polygonal pattern does not need be used in calculating a centric coordinate at each level until a final location is obtained. For example, at first level, the centric coordinates of a triangle may be calculated. At next level, the centric coordinates of a square may be calculated and so on. By way of another example, the shape or figure used for the calculation may depend on a number of access points at each level or total. Moreover, the shape or figure used may depend on a level of service selected (high/gold premium, premium, or regular).

Figure 11:
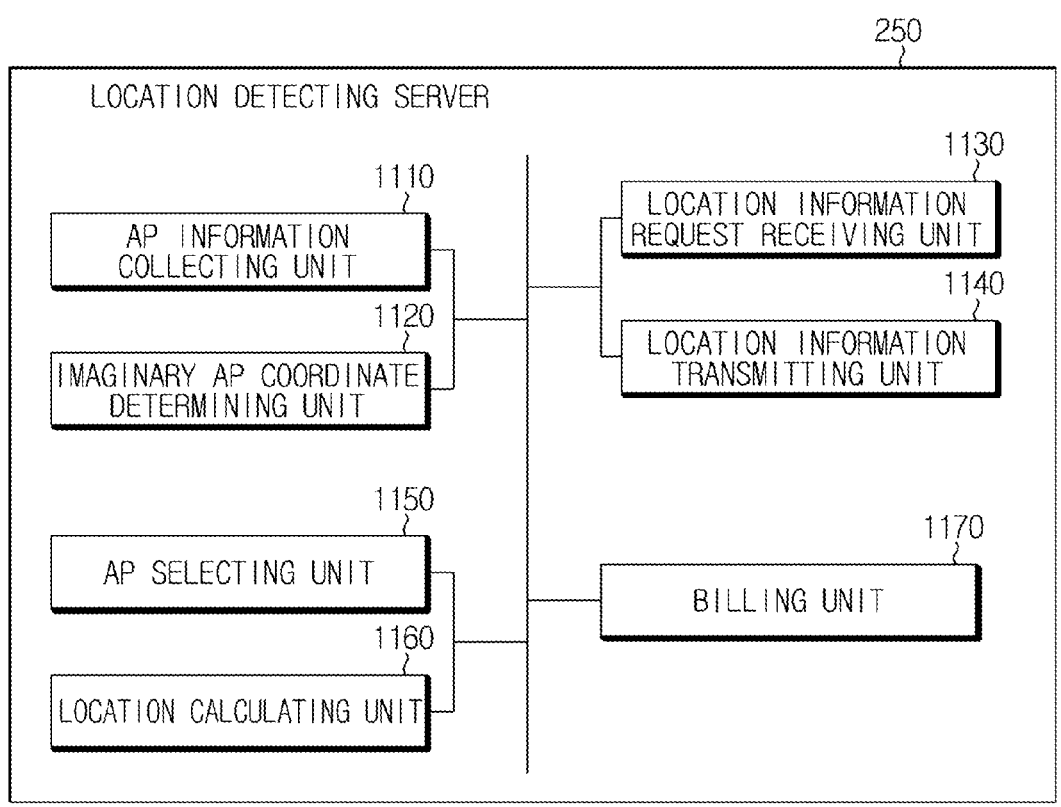
FIG. 11 is a block diagram illustrating a structure of a location detecting server according to an exemplary embodiment.

FIG. 11 is a block diagram illustrating a structure of the location detecting server 250 according to an exemplary embodiment.

Referring to FIG. 11, the location detecting server 250 according to an exemplary embodiment includes an access point information collecting unit 1110, an imaginary location coordinate determining unit 1120, a location information request receiving unit 1130, a location information transmitting unit 1140, an access point (AP) selecting unit 1150, a location calculating unit 1160, and a billing unit 1170.

The access point information collecting unit 1110 receives access point information for location collected by the access point information collecting terminal in accordance with a predetermined time cycle, and stores the access point information for a location in the access point information DB 270. The access point information collecting unit 1110 may directly receive access point information for a location from the access point information collecting terminal via the Internet network 210 or the mobile communication network 230 (shown in FIG. 2). An example of the access point information for a location is shown in FIG. 4.

The imaginary location coordinate determining unit 1120 estimates and determines installation location coordinates of access points having no installation location coordinates based on the access point information for location collected by the access point information collecting unit 1110. The location coordinate estimated and determined by the imaginary location coordinate determining unit 1120 is defined as an imaginary location coordinate.

Specifically, the imaginary location coordinate determining unit 1120 extracts, from the access point information DB 270, collection information for a location of a specific access point, of which an installation location coordinate is not identified, among the collected access points. Also, after the imaginary location coordinate determining unit 1120 extracts the collection information for location of the specific access point, the imaginary location coordinate determining unit 1120 extracts the signal strength (for example, RSSI) among the collection information for location, arranges the extracted signal strength in the order of time, and analyzes the changes in the signal strength over time to extract a rising point of inflection. Here, the rising point of inflection is a point where the signal strength rises and reaches a highest level.

FIG. 6 is an example illustrating the extraction of a rising point of inflection based on a signal strength distribution of an access point over time. As shown in FIG. 6, when the signal strength of the access point is arranged in the order of time, points A and C are where the signal strength rises and reaches the highest, and thus, are extracted as the rising points of inflection.

When the rising points of inflection are extracted, the imaginary location coordinate determining unit 1120 calculates a centric coordinate of collection location coordinates of the rising points of inflection, that is, collection location coordinates where the signal strength of the rising points of inflection is collected. Also, the imaginary location coordinate determining unit 1120 determines the calculated centric coordinate as an imaginary location coordinate of the specific access point, and stores the imaginary location coordinate in the access point information DB 270. Here, the centric coordinate may be a barycenter or any one of an incenter and a circumcenter.

Accordingly, an actual location coordinate or an imaginary location coordinate of each access point is stored in the access point information DB 270.

The location information request receiving unit 1130 receives a request for a location detection including the service grade. The request for the location detection including the service grade may be received from a target communication terminal for a location detection or another communication terminal that has requested a location of other communication terminal.

The location information request receiving unit 1130 receives, from a target communication terminal, information (for example, MAC address and signal strength) of nearby access points detected by the target communication terminal. The information of the nearby access points may be received together with the request for a location detection or may be received from the target communication terminal independent of the request for a location detection under the control of the location information request receiving unit 1130.

The location information transmitting unit 1140 transmits a location detection result including a location coordinate calculated by the location calculating unit 1160 to the subject having requested the location detection in response to the request for a location detection. The location detection result may be a map data indicating the location coordinate calculated by the location calculating unit 1160 or a message including address information corresponding to the location coordinate.

The access point selecting unit 1150 selects a predetermined number of access points among the nearby access points of which information is received by the location information request receiving unit 1130 based on the service grade received by the location information request receiving unit 1130.

For example, in the case of a high premium service, the access point (AP) selecting unit 1150 selects N access points among the nearby access points of which information is received by the location information request receiving unit 1130, in the case of a premium service, selects M access points, and in the case of a regular service selects R access points. Here, N>M>R, and all N, M and R may be $L^k$ where L is a natural number of 3 or more and k is a natural number.

When the access point selecting unit 1150 selects access points, the access point selecting unit 1150 may select top access points based on the signal strength or preferentially select access points of which actual location coordinates are stored by referring to the access point information DB 270. Further, among the access points, each of which has the actual location coordinates, the access point selecting unit 1150 may select only access points having a predetermined signal strength or more. Because an access point having low signal strength may be located at a distance from the target communication terminal, an access point having low signal strength is excluded from the selection although an actual location coordinate is stored.

The location calculating unit 1160 extracts location coordinates of the access points selected by the access point selecting unit 1150 from the access point information DB 270, and calculates a final one location coordinate using the extracted location coordinates by the barycentric method.

Specifically, for access points having actual location coordinates, the location calculating unit 1160 extracts the actual location coordinates of the corresponding access points from the access point information DB 270.

For access points having no actual location coordinates, the location calculating unit 1160 checks whether imaginary location coordinates are stored in the access point information DB 270, and if so, extracts imaginary location coordinates of the corresponding access points from the access point information DB 270.

For access points having no actual location coordinates and no imaginary location coordinates, the location calculating unit 1160 extracts collection location coordinates of the top 'i' ('i' is the number of access points) access points having high signal strength based on a signal strength for a location of the corresponding access points detected at each collection location, as the location coordinates of the corresponding access points.

For example, when there are three access points having no actual location coordinates and no imaginary location coordinates, in which the signal strength for a location of access point A is −40 dB and −50 dB, the signal strength for a location access point B is −50 dB, −60 dB, and −70 dB, and the signal strength for a location of access point C is −60 dB and −100 dB, the top three signal strengths are −40 dB and −50 dB of access point A and −50 dB of access point B. The location calculating unit 1160 extracts collection location coordinates where −40 dB and −50 dB of access point A and −50 dB of access point B are collected, as location coordinates of the access points having no actual location coordinates and no imaginary location coordinates.

The location calculating unit 1160 groups the access points selected by the access point selecting unit 1150, in which T (T is a natural number of 3 or more, and is preferably equal to L) access points are randomly selected in each group, and calculates a centric coordinate of each group using the extracted location coordinates of the access points. In this instance, the location calculating unit 1160 equally distributes the access points having actual location coordinates to each group.

Also, the location calculating unit 1160 groups the calculated centric coordinates, in which T centric coordinates are randomly selected in each group, and re-calculates a centric coordinate of each group. The location calculating unit 1160 repeats this process until one centric coordinate is obtained, and determines the obtained one centric coordinate as a final location of the target communication terminal.

When the location calculating unit 1160 calculates a centric coordinate based on this grouping, if a number X (T<X<2×M) of centric coordinates remain at the end, the location calculating unit 1160 may calculate one final centric coordinate by forming a polygon having the number X (T<X<2×M) of centric coordinates as the apices.

Alternatively, the location calculating unit 1160 may calculate one final centric coordinate by grouping centric coordinates, in which a predetermined number of centric coordinates in each group is not equal.

The billing unit 1170 bills for the location detection service based on the service grade received by the location information request receiving unit 1130. For example, a regular service is free, and a premium service and a high premium service are paid services wherein a service rate of the premium service is lower than that of the high premium service.

The access point described in the exemplary embodiment may be called a micro base station, a pico base station, aUbi-Cell base station, and the like, depending on the policies of the manufacturers or communication providers. Accordingly, it should be understood that the access point of an exemplary embodiment is a gateway point capable of providing an Internet service to a communication terminal through a common Internet line by directly communicating with the communication terminal via local area communications.

Also, it is obvious that the location detecting method of an exemplary embodiment(s) may be applied indoors as well as outdoors. In this instance, while latitude/longitude coordinate is used as a collection location coordinate outdoors, an imaginary location coordinate may be used as a collection location coordinate indoors. For example, the location detecting method of an exemplary embodiment may detect a location of a communication terminal using the barycentric method by setting imaginary location coordinates on each floor of a building classified by coordinates and collecting information of access points at each coordinate.

The method of the exemplary embodiment may be recorded in one or more non-transitory computer-readable media (such as, for example, a compact disk-read only memory (CD ROM), random access memory (RAM), read-only memory (ROM), floppy disks, hard disks, magneto-optical disks, and the like) including program instructions to implement various operations which are executable by a computer.

While this specification contains many exemplary features, these exemplary features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that exemplary embodiments do not require the distinction of various system components made in an exemplary embodiment. The program components and system may be generally implemented as a single software product or multiple software product packages.

A number of examples have been described above. Nevertheless, it will be understood that various modifications may be made. The foregoing exemplary embodiments have been particularly shown and described. It will be understood by those of ordinary skill in the art that various changes in form and details may be made therein without departing from the spirit and scope of an inventive concept as defined by the appended claims. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. The exemplary embodiments can be readily applied to other types of apparatuses. The scope is defined not by the detailed description of exemplary embodiments but by the appended claims, and all differences within the scope will be construed as being included in an inventive concept.

What is claimed is:

1. A method of detecting a location of a communication terminal, the method comprising:
selecting a predetermined number of access points among a plurality of access points based on at least one of user input and attributes of the plurality of access points;
obtaining a location coordinate of each of the selected access points;
calculating a centric coordinates using the obtained location coordinates of at least two of the selected access points; and
determining the calculated centric coordinate as the detected location of the communication terminal,
wherein the selecting the predetermined number of access points comprises hierarchically organizing the plurality of access points such that an access point with an installation location coordinate being identified is ranked highest, and selecting an access point having the highest ranking.

2. A method of detecting a location of a communication terminal, the method comprising:
storing location coordinates of at least two of a plurality of access points;
receiving service grade information as a user input;
selecting a predetermined number of access points among a plurality of access points based on at least one of the user input and attributes of the plurality of access points;
obtaining the location coordinate of each of the selected access points;
calculating a centric coordinates using the obtained location coordinates of at least two of the selected access points;
determining the calculated centric coordinate as the detected location of the communication terminal;
wherein the calculating the centric coordinates comprises:
grouping the obtained location coordinates and calculating a centric coordinate in each group; and
grouping the calculated centric coordinates and calculating a centric coordinate of each calculated centric group in a repetitive manner to obtain the detected location.

3. The method of claim 2, wherein the grouping the obtained location coordinates and the calculating comprises grouping the location coordinates such that M location coordinates are included in each group where M is $L^i$ in which L is a natural number of 3 or more and 'i' is a natural number of 2 or more.

4. The method of claim 1, wherein the selecting further comprises selecting nearby access points among the plurality of access points having high signal strength.

5. The method of claim 1, further comprising storing the location coordinates of at least some of the plurality of access points;
wherein the stored location coordinates comprise real coordinate values and imaginary location coordinates, and
wherein the obtaining the location coordinate comprises estimating values of the imaginary location coordinates.

6. A method of detecting a location of a communication terminal, the method comprising:
selecting a predetermined number of access points among a plurality of access points based on installation location coordinates of the plurality of access points such that an access point with an identified installation location coordinate is ranked higher for the selecting;
obtaining a location coordinate of each of the selected access points;
calculating a centric coordinates using the obtained location coordinates of at least two of the selected access points;

determining the calculated centric coordinate as the detected location of the communication terminal; and storing the location coordinates of at least some of the plurality of access points, wherein the stored location coordinates comprise real coordinate values and imaginary location coordinates, wherein the obtaining the location coordinate comprises estimating values of the imaginary location coordinates, and wherein the estimating the imaginary location coordinates for an access point comprises:

collecting signal strengths for a location of the access points in a predetermined time period;

extracting a rising point of inflection by analyzing fluctuations in the signal strengths for a location of one of the access points arranged in sequentially using time; and determining the imaginary location coordinates of the access point based on the extracted rising point of inflection.

7. The method of claim 6, wherein the rising point of inflection is a point where the signal strength is highest.

8. A method of detecting a location of a communication terminal, the method comprising:

selecting a predetermined number of access points among a plurality of access points based on at least one of a user input and attributes of the plurality of access points;

obtaining a location coordinate of each of the selected access points;

calculating a centric coordinates using the obtained location coordinates of at least two of the selected access points; and determining the calculated centric coordinate as the detected location of the communication terminal, wherein the calculating the centric coordinates comprises:

obtaining installation location coordinates for a first set of access points, which have installation location coordinates identified, among the selected predetermined number of access points;

obtaining estimated imaginary location coordinates for a second set of access points which have installation location coordinates unidentified, among the selected predetermined number of access points; and calculating a collection location coordinates for a third set of access points which have installation location coordinates and estimated imaginary location coordinates unidentified, among the selected predetermined number of access points.

9. The method of claim 8, wherein the calculating the collection location coordinate of an access point in the third set comprises determining the collection location coordinate based on where the highest signal strength is collected, among collection location coordinates of the access point in the third set.

10. The method of claim 1, further comprising:

billing the communication terminal for a location detecting service.

11. An apparatus for detecting a location of a communication terminal, the apparatus comprising:

a memory storing executable software components; and a processor configured to execute the software components comprising:

a selector configured to select a predetermined number of access points among a plurality of access points based on at least one of user input and attributes of the plurality of access points; and an obtainer configured to obtain a location coordinate of each of the selected access points, and a calculator configured to calculate a centric coordinates using the location coordinates of at least two of the selected access points, and which determines the calculated centric coordinate as the detected location of the communication terminal, wherein the selector hierarchically organizes the plurality of access points such that an access point with an installation location coordinate being identified is ranked highest, and selects an access point having the highest ranking.

12. An apparatus for detecting a location of a communication terminal, the apparatus comprising: a memory storing executable software components; and a processor configured to execute the software component;

wherein the software components executable by the processor further comprise:

a selectors configured to select a predetermined number of access points among a plurality of access points based on at least one of user input and attributes of the plurality of access points; and an obtainer configured to obtain a location coordinate of each of the selected access points; and a calculator configured to calculate a centric coordinates using the location coordinates of at least two of the selected access points, and which determines the calculated centric coordinate as the detected location of the communication terminal, wherein at least one of the selector, the obtainer, and the calculator comprises at least one hardware component, wherein the apparatus further comprises a memory configured to store the location coordinates of at least some of the plurality of access points, wherein the apparatus further comprises a receiver configured to receive a service grade information as the user input, and wherein the calculator groups the obtained location coordinates and calculates a centric coordinate in each group, and groups the calculated centric coordinates and calculates a centric coordinate of each calculated centric group in a repetitive manner to obtain the detected location.

13. The apparatus of claim 12, wherein the calculator groups the location coordinates such that M location coordinates are included in each group where M is $L^i$ in which L is a natural number of 3 or more and 'i' is a natural number of 2 or more.

14. The apparatus of claim 11, wherein the selector selects nearby access points among the plurality of access points having high signal strength.

15. The apparatus of claim 11, wherein the memory is further configured to store the location coordinates of at least two of the plurality of access points; and wherein the software components executable by the processor further comprise an imaginary location coordinate estimator configured to estimate imaginary location coordinates of at least one of the plurality of access points and stores the estimated imaginary location coordinates in the memory.

16. An apparatus for detecting a location of a communication terminal, the apparatus comprising:

a memory storing executable software components; and a processor configured to execute the software components comprising:

a selector configured to select a predetermined number of access points among a plurality of access points based on installation location coordinates of the plurality of access points such that an access point with an identified installation location coordinate is ranked higher for the selecting; and an obtainer configured to obtain a location coordinate of each of the selected access points, a calculator configured to calculate a centric coordinates using the location coordinates of at least two of the selected access points, and which determines the calculated centric coordinate as the detected location of the communication terminal; and a collector configured to collect the signal strength for a location of the access points in a predetermined time period, wherein the memory is further configured to store the location coordinates of at least two of the plurality of access points, wherein the software components executable by the processor further comprise an imaginary location coordinate estimator configured to estimate imaginary location coordinates of at least one of the plurality of access points and stores the estimated imaginary location coordinates in the memory, and wherein the imaginary location coordinate estimator extracts a rising point of inflection by analyzing fluctuations in the signal strengths for the location of one of the access points arranged sequentially using time, and determines the imaginary location coordinates of the access point based on the extracted rising point of inflection.

17. The apparatus of claim 16, wherein the rising point of inflection is a point where the signal strength is highest.

18. An apparatus for detecting a location of a communication terminal, the apparatus comprising:

a memory storing executable software components; and a processor configured to execute the software components comprising:

a selector configured to select a predetermined number of access points among a plurality of access points based on at least one of user input and attributes of the plurality of access points; and an obtainer configured to obtain a location coordinate of each of the selected access points, and a calculator configured to calculate a centric coordinates using the location coordinates of at least two of the selected access points, and which determines the calculated centric coordinate as the detected location of the communication terminal, wherein the calculator obtains installation location coordinates for a first set of access points, which have installation location coordinates identified, among the selected predetermined number of access points, obtains estimated imaginary location coordinates for a second set of access points, which have installation location coordinates unidentified, among the selected predetermined number of access points, and calculates a collection location coordinates for a third set of access points, which have installation location coordinates and estimated imaginary location coordinates unidentified, among the selected predetermined number of access points.

19. The apparatus of claim 18, wherein the calculator calculates a collection location coordinate of an access point in the third set based on where the highest signal strength is collected.

20. The apparatus of claim 11, wherein the software components executed by the processor further comprise a billing component configured to bill the communication terminal for a location detecting service.

21. An apparatus for detecting a location of a communication terminal, the apparatus comprising:

a receiver configured to receive a service grade information, which is selected by a user from among a plurality of service grades comprising a premium service, a regular service, and a low accuracy service and to receive information of access points among a plurality of access points where the access points are selected based on the service grade information such that more access points from the plurality of access points are selected with the premium service as opposed to the regular service and the low accuracy service; and a processor configured to obtain a location coordinates of each of the selected access points to calculate a centric coordinate using the obtained location coordinates of at least two of the selected access point, and configured to determine the calculated centric coordinate as the detected location of the communication terminal, wherein the receiver comprises at least one hardware component.

22. The method of claim 2, wherein the selecting the predetermined number of access points is based on the received service grade information.

23. The method of claim 6, wherein the estimating the imaginary coordinate of the access point further comprises determining a centric coordinate from at least two extracted rising point of inflections.

24. The method of claim 1, further comprising billing the communication terminal for a location detecting service based on a service grade information selected by the communication terminal.

25. The method of claim 1, further comprising billing a subscriber for the detected location of the communication terminal based on a selection of a level of location detection service by the subscriber.

26. The method of claim 1, wherein the subscribe request the detection of the location from a device different from the communication terminal.

27. The method of claim 1, further comprising:

obtaining information related to the plurality of access point from the communication terminal which is mobile;

storing information related to the plurality of access points, wherein the information comprises for each location storing time, address, the location, a signal strength, and a cell identifier.

28. A method of detecting a location of a communication terminal, the method comprising:

selecting a predetermined number of access points among a plurality of access points based on a service grade information of the communication terminal and attributes of the plurality of access points;

obtaining a location coordinate of each of the selected access points;

calculating a centric coordinates using the obtained location coordinates of at least two of the selected access points;

determining the calculated centric coordinate as the detected location of the communication terminal, and wherein the predetermined number is determined by the service grade information.

29. An apparatus for detecting a location of a communication terminal, the apparatus comprising:

a memory storing executable software components; and a processor configured to execute the software components comprising:
> a selector configured to select a predetermined number of access points among a plurality of access points based on a service grade information of the communication terminal and attributes of the plurality of access points, wherein the predetermined number is determined by the service grade information; and
> an obtainer configured to obtain a location coordinate of each of the selected access points, and
> a calculator configured to calculate a centric coordinates using the location coordinates of at least two of the selected access points, and which determines the calculated centric coordinate as the detected location of the communication terminal, wherein at least one of the selector, the obtainer, and the calculator comprises at least one hardware component.

* * * * *